(12) United States Patent
Biermayr et al.

(10) Patent No.: US 12,015,738 B2
(45) Date of Patent: Jun. 18, 2024

(54) COMPUTER-IMPLEMENTED METHOD OF PROCESSING AN EMERGENCY CALL AND EMERGENCY COMMUNICATION NETWORK

(71) Applicant: ATOS Public Safety, LLC, Irving, TX (US)

(72) Inventors: Rodrigo Kaminski Biermayr, Curitiba (BR); Amauri Crovador, Paraná (BR); Nadya Hauenstein, Paraná (BR)

(73) Assignee: UNIFY PATENTE GMBH & CO. KG, Munich (DE)

( * ) Notice: Subject to any disclaimer, the term of this patent is extended or adjusted under 35 U.S.C. 154(b) by 0 days.

(21) Appl. No.: 17/536,596

(22) Filed: Nov. 29, 2021

(65) Prior Publication Data
US 2022/0174151 A1    Jun. 2, 2022

(30) Foreign Application Priority Data
Nov. 30, 2020   (EP) ..................................... 20210713

(51) Int. Cl.
| | | |
|---|---|---|
| *H04M 3/51* | (2006.01) | |
| *H04M 3/42* | (2006.01) | |
| *H04M 7/12* | (2006.01) | |
| *H04W 4/02* | (2018.01) | |
| *H04W 4/021* | (2018.01) | |
| *H04W 4/90* | (2018.01) | |

(52) U.S. Cl.
CPC ..... *H04M 3/5116* (2013.01); *H04M 3/42042* (2013.01); *H04W 4/021* (2013.01); *H04W 4/025* (2013.01); *H04W 4/90* (2018.02); *H04M 7/126* (2013.01)

(58) Field of Classification Search
CPC ....... H04W 4/90; H04W 4/021; H04W 4/025; H04M 3/42042; H04M 3/5116
USPC .......................................... 379/52; 455/404.1
See application file for complete search history.

(56) References Cited

U.S. PATENT DOCUMENTS

| | | | |
|---|---|---|---|
| 11,330,104 B1 * | 5/2022 | Pappas ................ | H04L 65/1069 |
| 2005/0181805 A1 * | 8/2005 | Gallagher ............. | H04W 88/06 |
| | | | 455/456.1 |

(Continued)

OTHER PUBLICATIONS

European Search Report for European Application No. 20210713.2 dated May 6, 2021.

*Primary Examiner* — Maria El-Zoobi
(74) *Attorney, Agent, or Firm* — MEAGHER EMANUEL LAKS GOLDBERG & LIAO, LLP

(57) ABSTRACT

A method of processing an emergency call in an emergency communication network can include receiving an emergency call from an emergency caller from a first mobile communication device that is received via a SIP INVITE message; obtaining location information of the location of the first mobile communication device; determining a PSAP that is in the vicinity of the location of the first mobile communication device, and forwarding the emergency call to the PSAP for being handled by a call taker at the PSAP. The ESRP can request location information of all mobile communication devices that are in the vicinity of the first mobile communication device and, upon receipt of the location information, create a list of all mobile communication devices that are in the vicinity of the first mobile communication device for transmitting the list to the PSAP to be displayed at a display device of a call taker.

18 Claims, 9 Drawing Sheets

(56) References Cited

U.S. PATENT DOCUMENTS

| | | | |
|---|---|---|---|
| 2009/0137222 A1* | 5/2009 | Heen | H04W 68/02 455/404.1 |
| 2009/0284348 A1* | 11/2009 | Pfeffer | G08B 25/006 340/7.3 |
| 2011/0064205 A1* | 3/2011 | Boni | H04M 11/04 379/45 |
| 2013/0052984 A1 | 2/2013 | Mohler et al. | |
| 2018/0199304 A1* | 7/2018 | Wilson | H04W 4/02 |
| 2020/0305059 A1 | 9/2020 | Mitchell, Jr. | |
| 2022/0141917 A1* | 5/2022 | Sanghavi | H04W 76/50 455/3.05 |

\* cited by examiner

| Location Service Approach | Accuracy | Mobile Device Capabilities Needed |
|---|---|---|
| Cell-ID Based | Depends on cell size (between 5 to 20 Km) | None – Network Based |
| AOA (Angle of Arrival) | 100 to 200 meters | None – Network Based |
| AGPS (Assisted Global Positioning System) | 10 to 50 meters | Yes – Mobile Device Assisted |
| E OTD (Enhanced observed time difference) | 100 to 150 meters | Yes – Mobile Device Assisted |
| UTDOA (Uplink time difference of arrival) | 50 to 100 meters | None – Network Based |

Fig. 7

COMPUTER-IMPLEMENTED METHOD OF PROCESSING AN EMERGENCY CALL AND EMERGENCY COMMUNICATION NETWORK

CROSS-REFERENCE TO RELATED APPLICATION

The present application claims priority to European Patent Application No. EP 20 210 713.2, which was filed on Nov. 30, 2020. The entirety of this European Patent Application is incorporated by reference herein.

FIELD

The present invention relates to a computer-implemented method of processing an emergency call and a corresponding emergency communication network.

BACKGROUND

The Next Generation 9-1-1 (NG9-1-1) project aims at constantly improving public emergency communications services specifically for users of mobile devices. For emergency call services with Next Generation Emergency Call Systems (NG9-1-1 or NG1-1-2), the use of the internet will allow the Emergency Service IP Network (ESINET), to easily retrieve the location information of the emergency caller. The ESINET will use the location information to determine the nearest or most convenient Public Safety Answering Point, PSAP, to respond to the emergency call. At a PSAP, the emergency call will be routed to emergency service personnel (call takers) who will provide the first response, transferring the call to the police, medical center, or any other services to assist and help the emergency caller.

In most of the cases, the caller uses a mobile phone to call the emergency services. In fact, according to the National Emergency Number Association (NENA) statistics, in some areas, 80% of the emergency calls are made using mobile devices, and this number is continuously growing.

SUMMARY

We determined that emergency calls that are initiated by mobile devices can be located according to the ANI/ALI (automatic number identification/automatic location identification) provided by the mobile providers to the emergency systems. On the other hand, if the call is made from a landline, i.e., a telephone connected to the lines on the poles, a Location Information Service (LIS) in the ESINET or PSAP provides the number and address of the phone, generally, the organization's main billing address.

Nowadays, we believe most people are using mobile phones and the mobile service provider can determine the current location of the mobile devices by different techniques. We determined that this can enable tracking of an emergency caller and co-located mobile phone users who are located, for example, in the same cell and registered at the same antenna. By also being able to track co-located or nearby mobile phone users, it is possible to recruit people nearby an emergency incident that has been reported so as to provide help or assistance to the emergency caller.

However, this information neither is accessible in the ESINET network nor in the PSAPs. Although a recruited person can be called and added, for example, to the emergency conference bridge with all other emergency services like police, medic as well, currently, this is only possible using separate solutions. An approach integrated into the Next Generation (NG) IP network is not available. We have determined that a new method and apparatus can be configured for overcoming the above mentioned problem of providing an integrated solution.

For instance, a computer-implemented method of processing an emergency call in an emergency communication network can include:

receiving, at an Emergency Service Routing Proxy (ESRP), an emergency call from an emergency caller using a first mobile communication device, the emergency call being received via a Session Initiation Protocol (SIP) INVITE message;

obtaining location information of the location of the first mobile communication device;

determining a Public Safety Answering Point (PSAP) that is in the vicinity of the location of the first mobile communication device, and forwarding the emergency call to the PSAP for being handled by a call taker at the PSAP, wherein the method further comprises a step of requesting, by the ESRP, location information of all mobile communication devices that are in the vicinity of the first mobile communication device, upon receipt of the location information, creating a list of all mobile communication devices that are in the vicinity of the first mobile communication device, and transmitting the list to the PSAP to be displayed at a display device of a call taker at the PSAP handling the emergency call.

Embodiments can involve locating and recruiting users of communication devices located nearby a communication device by means of which a user has made a NG911/NG112 emergency call exhibits a solution to deploy this relationship inside the ESINET using the standard Session Initiation Protocol (SIP) protocol and the location information present on the IP network. Candidates for providing support and/or assistance with respect to a reported emergency call that are near to the emergency response location are presented to the PSAP, allowing it to select, call them, and make them join into the first response using all the advantages of the deployed ESINET solution. SIP methods may be used in order to continuously refresh this information along with the emergency call.

Embodiments of the method can include selecting, from the list, a mobile communication device that is closest to the first communication device. Closest to the first mobile communication device or in the vicinity of the first mobile communication device may mean that the all mobile communication devices including the first mobile communication device and the other mobile communication devices are registered at the same antenna or are located within the same cell-ID, CID. Preferably, the location information either is provided by value or by reference.

In some embodiments, the list of communication devices can be a list of such devices located in the vicinity of the first communication device. Such a list can include, for example, a list of devices that are in the same CID as the device that made the emergency call. This list can be continuously updated.

Embodiments of the method can also include establishing a conference bridge between the first communication device of the emergency caller and the call taker at the PSAP and adding the mobile communication device selected from the list to the conference bridge. In some embodiments, a request for assistance in the reported emergency incidence can be sent to the mobile communication device selected from the list. A first response attendant can also be added to the conference bridge.

Preferably, the method can include requesting a cell-ID, CID, of the first mobile communication device for identifying each base transceiver station, BTS, or sector of a BTS within a location area code, LAC. The ANI of all mobile communication devices in the CID of the first mobile communication device can also be requested along with the LIS for their respective current location.

Embodiments of the method can also include displaying a map on which the emergency incident location and co-located mobile communication devices are displayed. The display of the map can occur on a display of a terminal device a user may utilize, display connected to the PSAP, display of a mobile communication device, or other display. Preferably, the map includes indications of emergency facilities in the vicinity of the emergency incident location. Updated location information of the communication devices located in the vicinity of the first communication device can be refreshed on the map as well.

An emergency communication apparatus can also be provided. Embodiments of the apparatus can include an ESRP, or a system. In some embodiments, the apparatus an be a network including an ESRP connected to a PSAP and an emergency processing engine adapted for carrying out an embodiment of the method for processing an emergency incident.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

FIG. 7 shows a table comprising data for a location service comparison;

Figure 1:
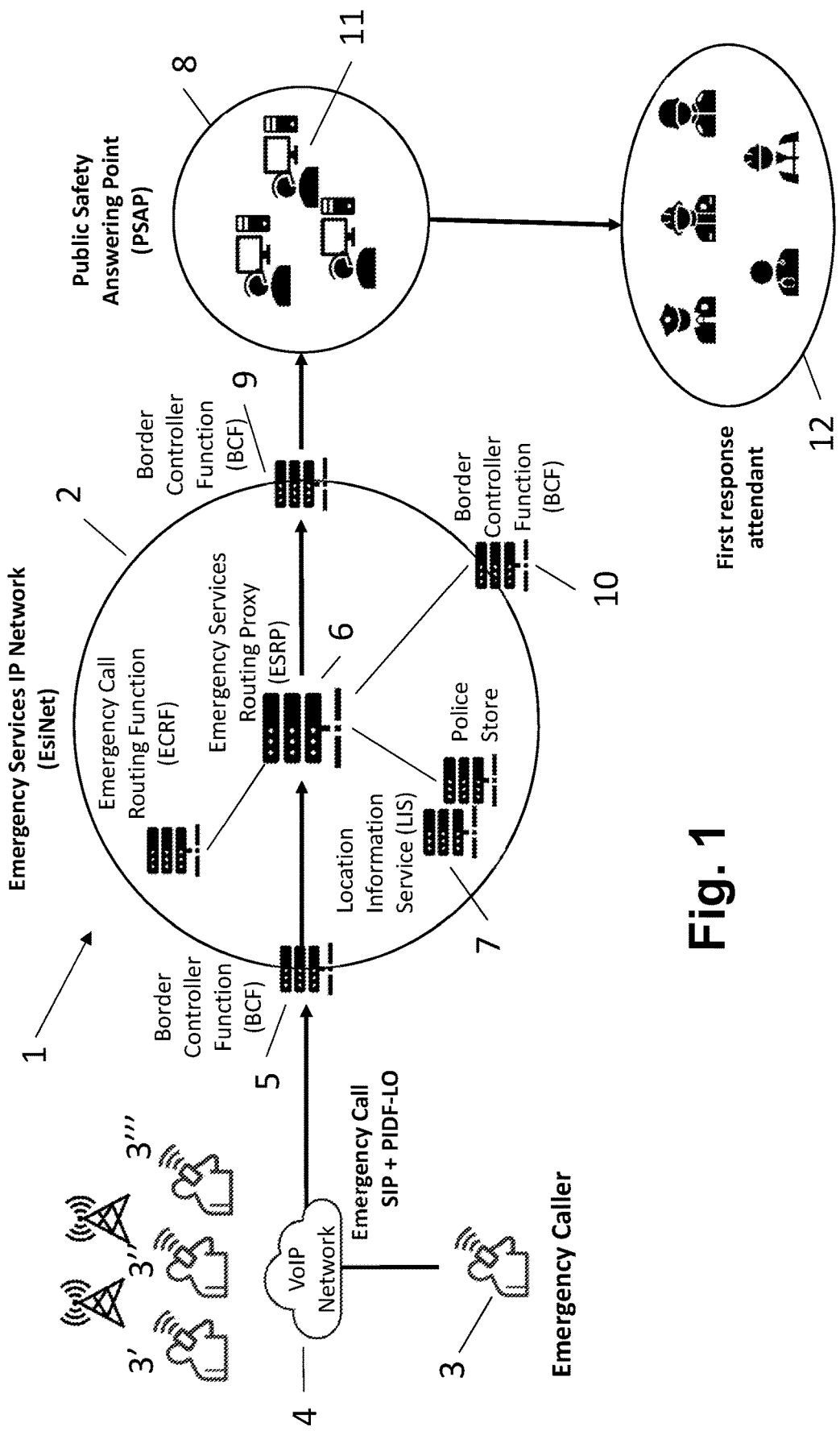
FIG. 1 shows a schematic overview of an emergency communication network according to an embodiment of the invention.

Reference characters used in the drawings include:
1 Emergency communication network
2 Emergency Service IP Network (ESINET);
3 Mobile phone;
4 VOW network;
5 BCF ingress;
6 ESRP;
7 Location Information Server (LIS);
8 PSAP;
9 BCF egress;
10 BCF;
11 Call taker;
12 First responder;
13 Emergency processing engine;
14 Provider;
15 Help candidates;
16 Emergency event location;
17 Server;
18 Screen;
19 Police station; and
20 Fire department.

DETAILED DESCRIPTION

FIG. 1 shows a schematic overview of an emergency communication network 1 according to an embodiment of the invention. Based on FIG. 1, in the following it will be explained how an emergency call is processed in the Emergency Service IP Network (ESINET) 2. Namely, in a first step, an emergency call is initiated by a caller of a mobile device 3. The emergency call is transmitted to and received at the ESINET 2 together location information either by value (PIDF-LO) or by reference (location URI). If the location information is received, then, in a further step, the ESINET 2 may also provide the location information. The emergency call is transmitted to the ESINET 2 via a SIP INVITE message using a Voice over IP (VoIP) network 4 connected to the ESINET 2 through a Border Controller Function (BCF) ingress 5 of a BCF 10. The BCF ingress 5 adds the ID of the emergency incident, in case this has not been provided from the previous network element and sends the emergency call to the Emergency Services Routing Proxy (ESRP) 6. Then, the ESRP 6 queries a Location Information Service (LIS) 7 to validate or retrieve the caller location information as already mentioned above, i.e., emergency location response (ELR), and queries Location to Service Translation, LoST, Server (not shown) which Public Safety Answering Point (PSAP) 8 (only one of which is shown in the figure) is the best or most efficient (e.g., the PSAP that is closest to the reported emergency incident) to send the call to. Thus, the ESRP 6 forwards the emergency call (e.g. the SIP INVITE message) to the PSAP 8 through a BCF egress 9 of the BCF 10, which is connected via the VOIP network 4. A call taker 11 at the PSAP 8 answers the emergency call and determines which emergency service should attend the event and add the first response attendant 12 to an emergency conference bridge established between the emergency caller 3 and the call taker 11.

It should be understood that the communication network can includes a number of telecommunication devices that each include hardware. For example, the ESRP and the PSAP can each be telecommunication devices that include hardware. The hardware can include at least one processor connected to a non-transitory memory and at least one transceiver. The memory can have code or an application stored thereon that defines a method that is performed by the telecommunications device when its processor runs the code or application. Each telecommunication device can also include a display one or more input devices, and one or more output devices that can be connected to its processor.

Each of the mobile phones of different users are type of communication terminals that include a processor connected to a non-transitory memory and at least one transceiver. Each of the phones can also include a display and can also include input devices (e.g. buttons, a stylus, etc.). Some users may utilize a different type of telecommunication terminal instead of a mobile phone (e.g. a laptop computer, a tablet, etc.).

Figure 2:
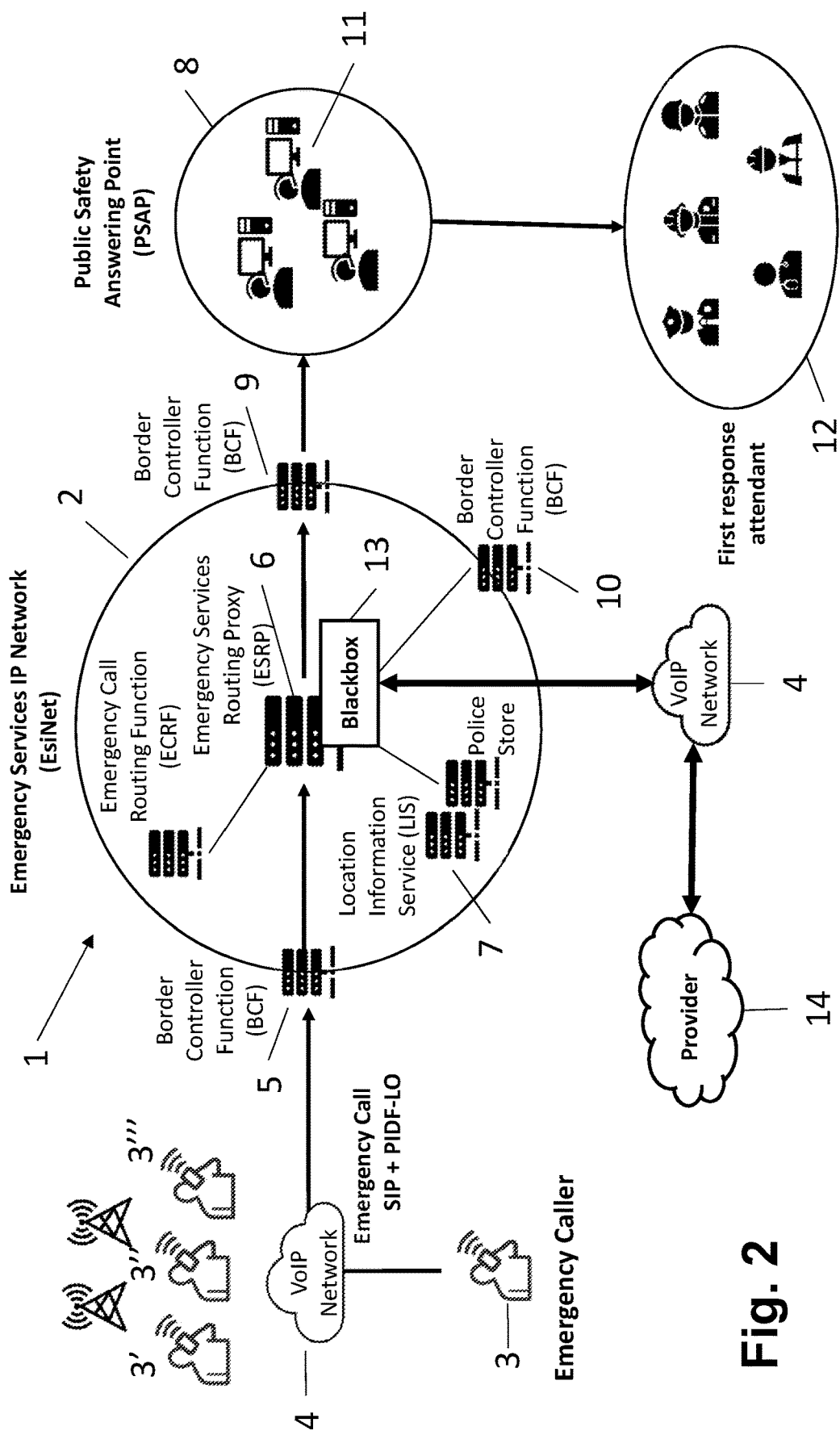
FIG. 2 illustrates an ESINET deployment for NG-9-1-1 according to an embodiment of the invention.

FIG. 2 illustrates an ESINET deployment for NG-9-1-1 according to an embodiment of the invention. In particular, here, the ESRP 6, after having received the emergency caller information, will request the ANI/ALI of all mobile devices 3', 3", 3'" in the area close to the location of the emergency caller's mobile device 3 from an emergency call processing engine 13 arranged and connected in the ESINET 2. For instance, if the emergency response location is set to 90065, Arroyo Seco Pkwy, N Figueroa St, a list of mobile users will be provided that are currently present in the area with their respectively ANI/ALIs. Then, the emergency call processing engine 13 will query the provider 14 for the cell-ID (CID) of the emergency caller 3, in case he or she uses a mobile device 3. It is noted that the CID is a unique number used to identify each base transceiver station, BTS, or sector of a BTS within a location area code, LAC. The emergency call processing engine 13 will also query the provider 14 for providing the ANIs of all mobile devices 3', 3", 3'" that are currently in the same CID. With the ANIs of the mobile devices 3', 3", 3'", the emergency call processing engine 13 will make a request for providing their current location is made to the Location Information Server (LIS) 7 hosting a location information service. Then, the emergency call processing engine 13 will create a list of candidates comprising their respective location information in an XML document, and the best candidates are select based on the nearest location information compared to the emergency caller's location. The XML file will be sent to the ESRP 6 to be added to a SIP message and to be sent to the PSAP 8. It is noted that this may be done during the initial SIP INVITE, or after the call taker 11 has accepted the emergency call already.

Figure 3:
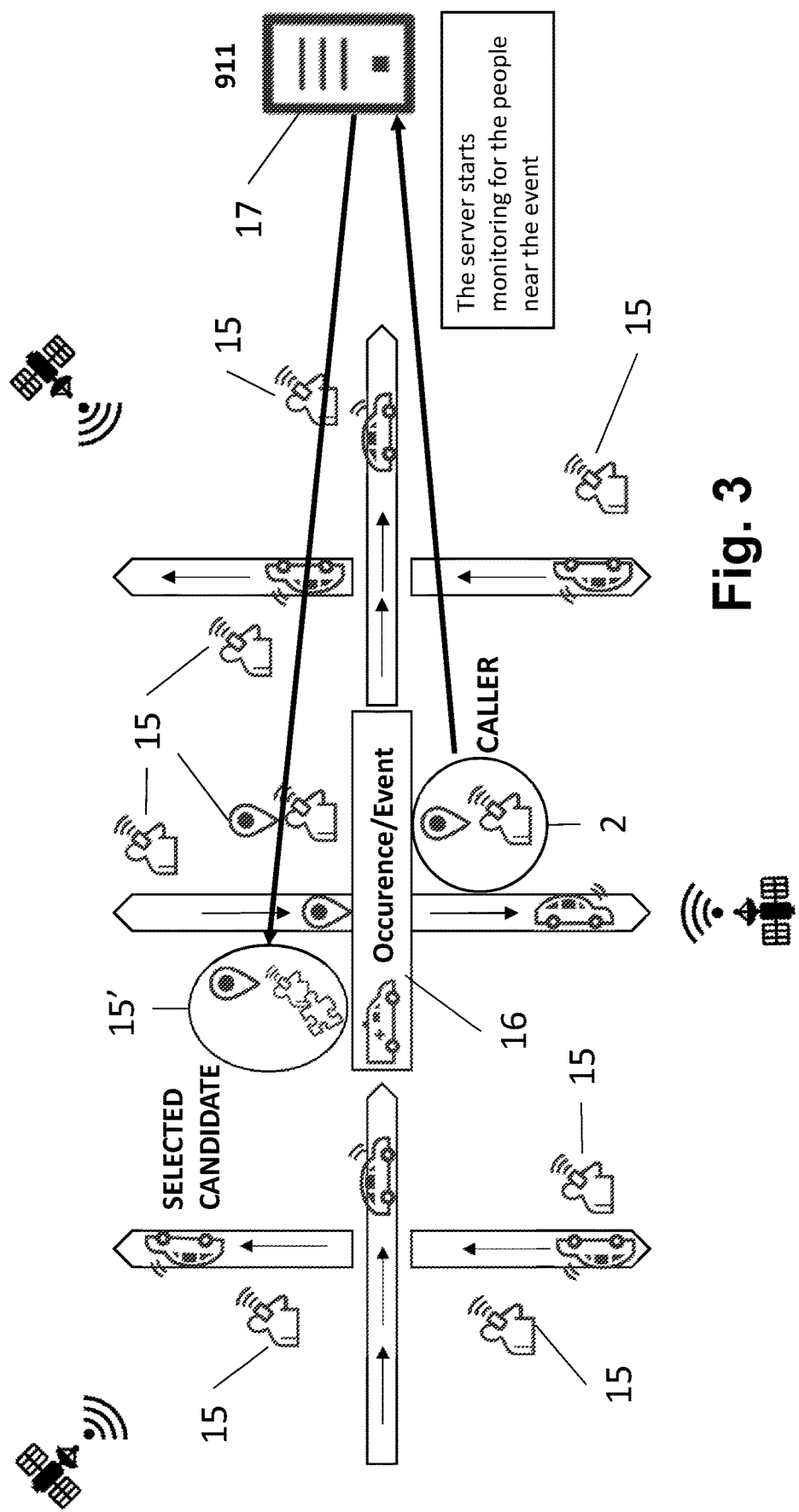
FIG. 3 schematically illustrates how help candidates are recruited at the PSAP according to an embodiment.

FIG. 3 schematically illustrates how help candidates are recruited at the PSAP 8 according to an embodiment. It is noted that the recruiting will be processed at the call taker's computing device (not shown). Namely, the call taker 11 (see FIG. 1, FIG. 2) receives the list of help candidates together with the emergency call data. The help candidates, indicated by reference numerals 15, actually are the mobile phone users 3', 3", 3'" described with respect to FIG. 1 and FIG. 2. The call-taker 11 may choose a help candidate 15' that is closest to the emergency response location 16 and contact him or her. According to an embodiment, this contact may be a voice call, but other methods, such as text messages, etc. may be used just as well. The decision to call a help candidate 15, 15' is up to the call taker 11 at the PSAP 8 and/or to the first response attendant's 12 responsibility. By answering the call, the candidate 15' is informed about the emergency incident, and asked to provide help or assistance. By agreeing to assist, the selected help candidate 15' will be added into the same conference bridge (not shown) with which the emergency call is answered. These steps may be carried out automatically by an algorithm implemented on the PSAP Server 17. For instance, an Interactive Voice Response system (IVR) may be used to contact the help candidate 15' from the list. Prompt messages may be used as follows:

1. You are being recruited to provide help assistance in an emergency
2. Event: . . . (brief description of the event, medical, police, etc.)
3. Location: . . . (text-to-speech can be used to provide the location of the emergency)
4. Press 1 to accept
5. Press 2 to decline
6. Please wait in the line while you are being redirected to the emergency attendant.

The candidate 15' will be added automatically into the emergency support bridge in the ESINET 2.

Figure 4:
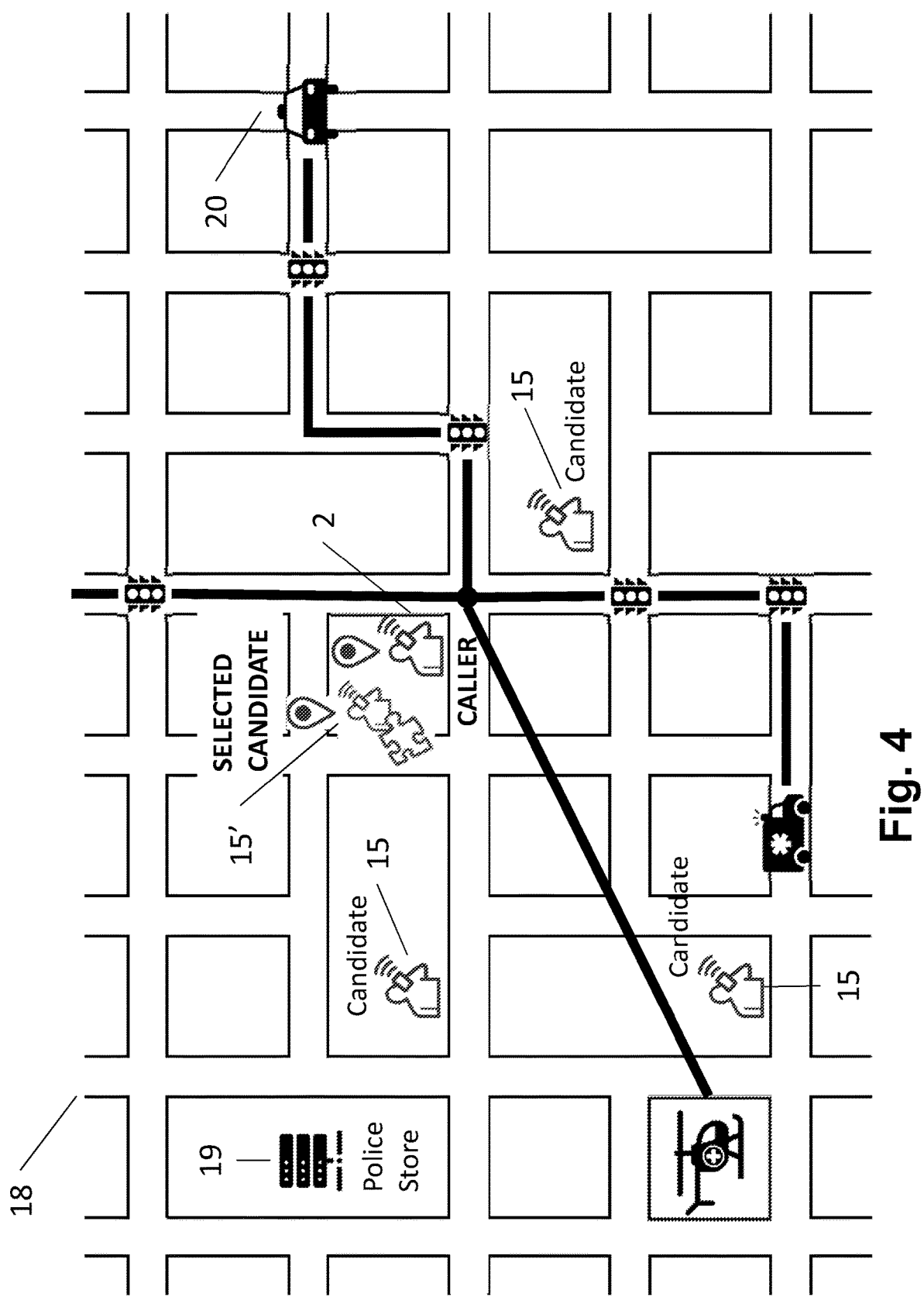
FIG. 4 shows an example for presenting help candidates for an emergency incident according to an embodiment of the invention.

FIG. 4 shows an example for presenting help candidates 15 as explained with respect to FIG. 3 for an emergency incident according to an embodiment of the invention. Here, an exemplary screen 18 of a display at the PSAP 8 is illustrated. On the screen 18, a map is shown, for example a map generated from Google, which comprises the area of and around the emergency incident. Further, the potential help candidates 15 and the selected help candidate 15' are indicated in the map as well as emergency facilities, as a police station 19, a fire department 20 or the like that are closest to the emergency incident are displayed on the map.

It is noted that the call taker 11 at the PSAP 8 that handles the emergency incident reported by the caller 3, may take the following additional steps. Namely, during the assistance, the call-taker 11 may decide to make a further request to the ESINET 1 for a new list of help candidates 15. This list may be related to the original location received with the INVITE message or a new location, in case the emergency caller 3 is no longer at the same location or he/she is reporting a situation in a location different from the one he/she is at. Then, the PSAP 8 sends a refresh request to the ESINET 2 using an in-dialog SIP request, for example a SIP UPDATE, containing the target location for the new help candidate list. This location information may either be by value (PIDF-LO) or by reference (Location URI). The ESINET 2 sends a new list of help candidates 15 in the SIP response, for example a 200 OK. The refresh process may also be initiated automatically at the PSAP console. The refresh procedure may occur repeatedly with a programmable time interval that may vary from seconds to minutes. This scenario has the advantage that the initial INVITE from the emergency call is not delayed, and provides the possibility to query a location different from the one reported at the beginning of the call. Once the refresh request is received from the PSAP 8, the ESINET 2 may request a new list of help candidates for the new location information received from the emergency handling engine 13, as already outlined above.

Figure 5:
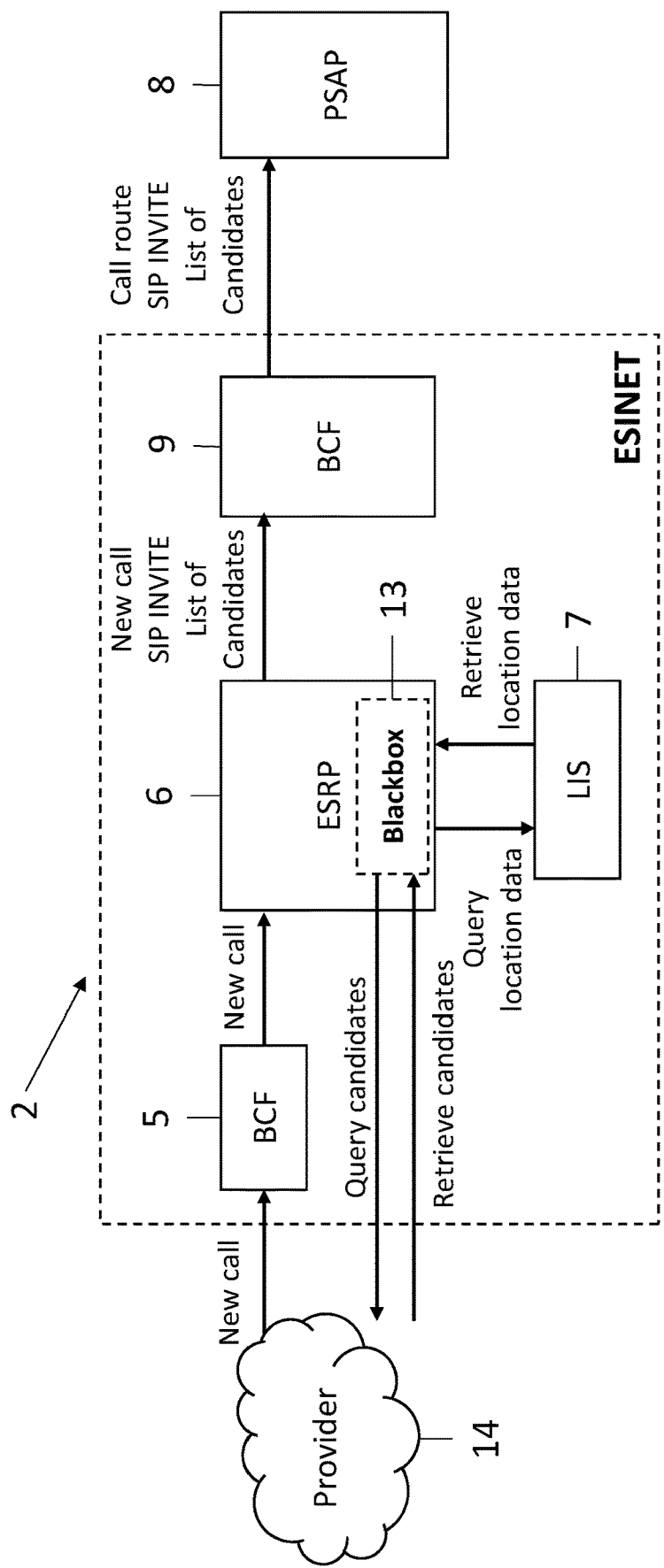
FIG. 5 shows an emergency processing engine implemented in the ESINET according to an embodiment of the invention.

FIG. 5 shows an emergency processing engine 13 implemented in the ESINET 2 according to an embodiment of the invention. The emergency processing engine 13 may be an application running on either a dedicated server or inside the ESRP 6 within the ESINET 2. According to this embodiment, the emergency processing engine 13 together with the ESRP 6 take the advantage of the centralized core of the ESINET solution. Here, the SIP offer-answer mechanism is implemented between the ESINET 2 and the PSAP 8. The emergency processing engine provides a mechanism by which a list of mobile users close to a location may be retrieved following the steps outlined above with respect to FIG. 2.

Figure 6:
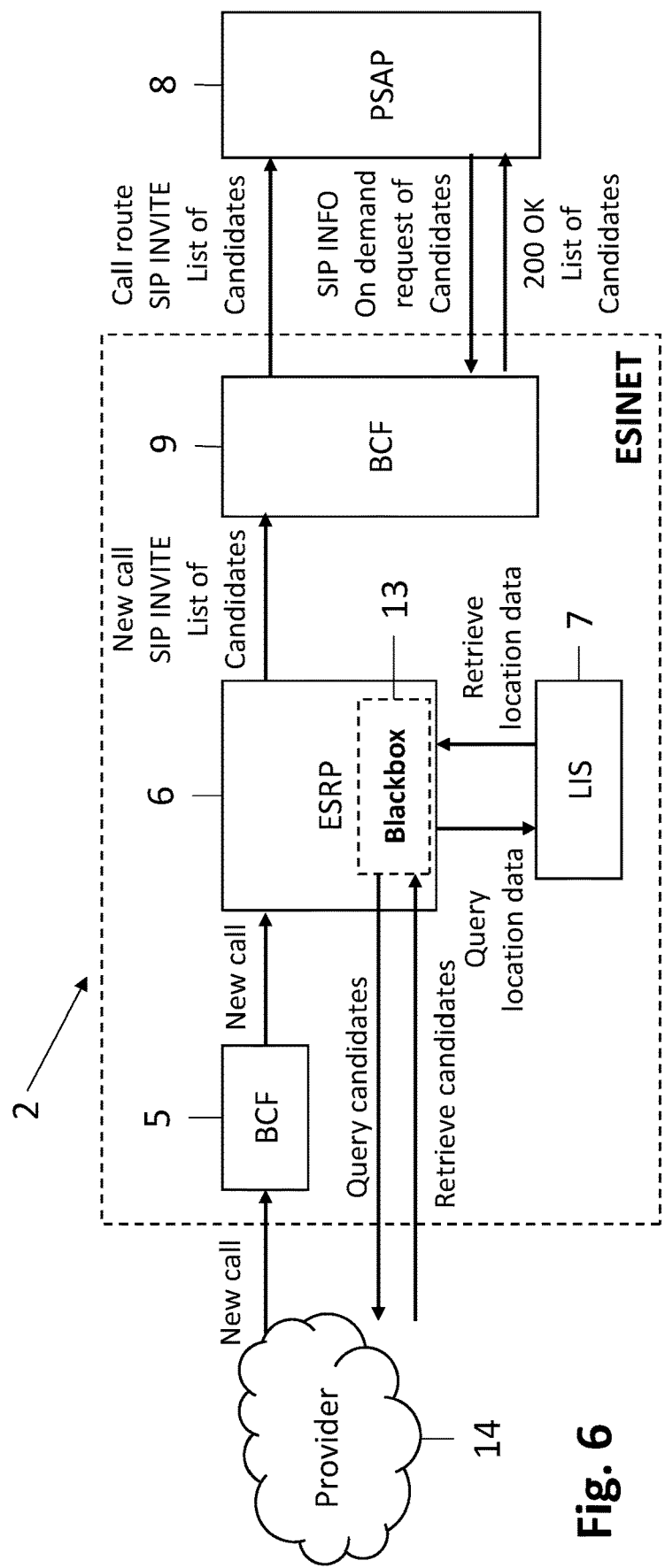
FIG. 6 illustrates a scenario for an embodiment in which the call taker triggers the request for providing a list of candidates.

FIG. 6 illustrates a scenario for an embodiment in which the call taker triggers the request for providing a list of candidates. The procedure illustrated here is the refresh procedure of the process described above with respect to FIG. 4, thus, the details are not repeated again and it is referred to FIG. 4.

In the following, the emergency processing engine 13 is explained in further detail. It implements 3 interfaces: the ESRP interface, a provider interface, and a LIS interface. The ESRP interface is defined by any API to request and retrieve a list of n elements containing help candidates 15 close to a determined location, the ERL (reference numeral 16, see FIG. 3). This query may be done using the ANI and/or ALI of the emergency caller 3, but other reference that can be used to retrieve a cell-id within the network provider. The number of candidates returned may also be negotiated through the API. The architecture and protocols for acquiring location information from a LIS 7 is defined by the Internet Engineering Task Force (IETF). The protocols used to retrieve the location information are the HTTP or HTTP Enabled Location Delivery (HELD). The location information provided by LIS 7 uses the GEOPRIV format (RFC 4119), for both geodetic position and civic address information (RFC5139). To interface with the network provider 14 (see FIG. 2), the emergency processing engine 13 may implement any applicable protocol. Location protocols such as HELD may apply.

Further, the emergency processing engine 13 may request to the access the network for all mobile phone users under a cell-ID. This may result in several users, depending on the size of the cell, or sector of the cell. The emergency processing engine 13 also is responsible to select the candidates 15, based on the proximity of the ERL 16, according to the number of elements defined by the ESRP 6. Additional criteria may also be used to select the candidates 15, for instance, a maximal distance from the target.

According to the RFC5491, it is specified that the PIDF format provides for an unbounded number of <tuple>, <device>, and <person> elements. Using the advantage to receive the location information from the LIS 7 in GEOPRIV format, the emergency processing engine 13 will return a single XML document, a PIDF-LO, with the selected candidates to the ESRP 6. Each candidate is presented as a <tuple>, <device> or <person> element, as illustrated below for an example of a PIDF-LO containing candidates:

```
<presence>
    <tuple id=candidate 01> -- #1
        <status>
            <geopriv> -- #1
                <location-info>
                    location element #1
                    location element #2
                    ...
                    location element #i
                <usage-rules>
            </geopriv>
            <geopriv> -- #2
            <geopriv> -- #3
            ...
            <geopriv>     #j
        </status>
    </tuple>
    <tuple id=candidate 02> -- #2
    <tuple id=candidate 03> -- #3
    <tuple id=candidate 04> -- #4
    ...
    <tuple id=candidate #n> -- #n
</presence>
```

FIG. 7 shows a table comprising data for a location service comparison according to an embodiment from which the accuracy may be derived. For both emergency caller and emergency help candidates, the location information will be provided or validated by the LIS 7, wherein the accuracy of these information follows the same criteria. The method used to determine the location of a mobile device in an access network depends on the type of the network. In wireless networks, there is range of technologies that may be used for location determination. Basically, these technologies follow two different approaches: network-based, or handset-based. In general, the ones that requires handset-based capabilities are the most accurate. It is noted that there is an ongoing effort by Federal Communication Commission (FCC) to impose to the wireless providers to make location information available to PSAPs based on the following standards:

For network-based technologies: 100 meters for 67% of calls, 300 meters for 90% of calls For handset-based technologies: 50 meters for 67% of calls, 150 meters for 90% of calls Further, it is noted that the usage of specific applications to connect devices to emergency services is a growing trend. Besides placing an emergency call, it transmits data (telematics, health, location, sensors, etc.) collected from the Internet of Things (IoT) and connected devices. To handle these data, there are platforms such as RapidSOS NG911 ClearingHouse (https://rapidsos.com/clearinghouse/) that provides APIs for integration with connected devices and the emergency attendant dashboard. For instance, this platform is being used in Los Angeles, CA and Cuyahoga county (https://ja.cuyahogacounty.us/en-US/Rapid-SOS.aspx), OH, in USA and there is a study case of integration with Uber app to provide car and passengers data in emergency situations.

Figure 8:
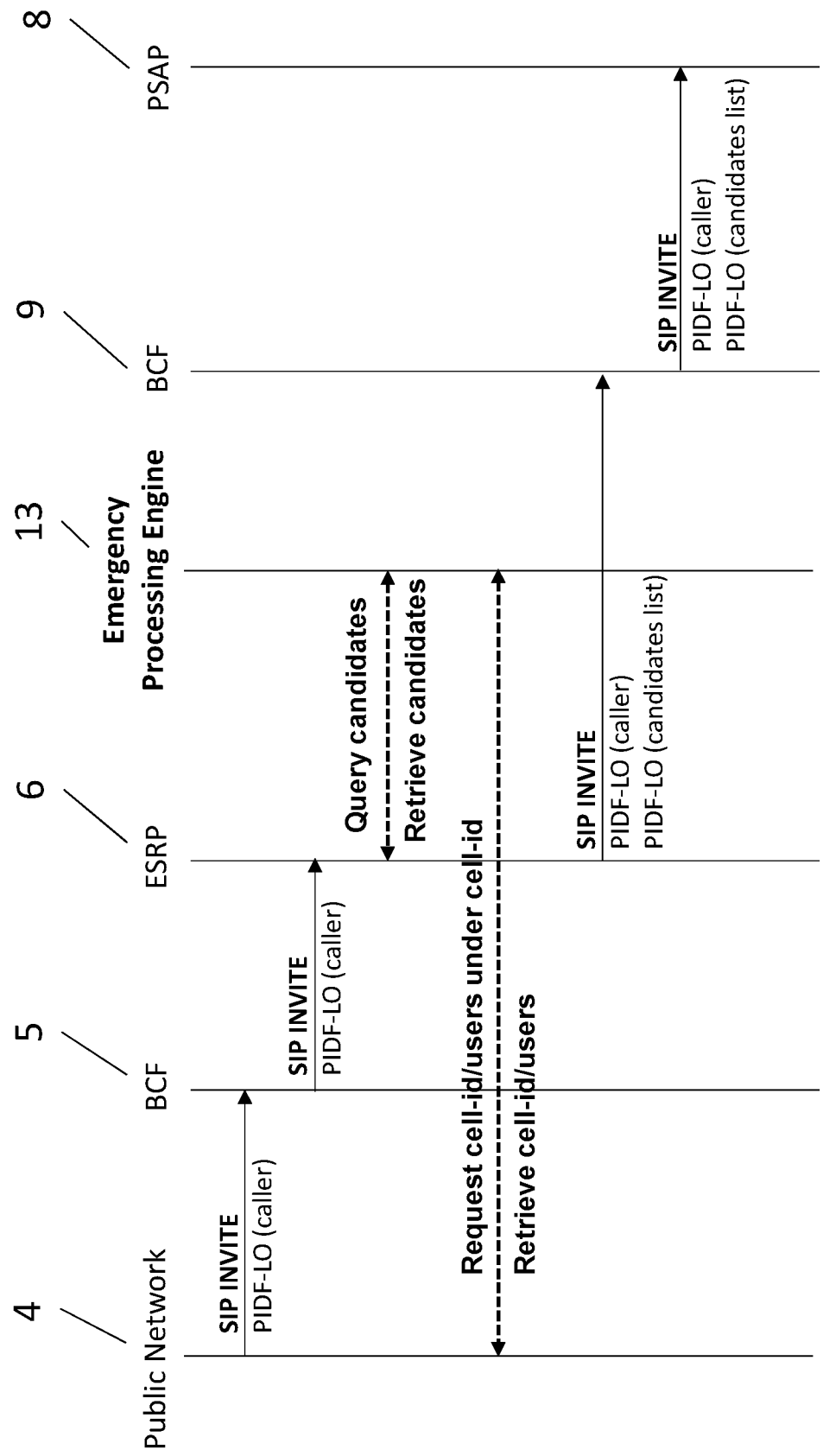
FIG. 8 illustrates the SIP message flows according to an offer-answer model according to an embodiment of the invention.

FIG. 8 illustrates the SIP message flows according to an offer-answer model according to an embodiment of the invention. Here, the list of help candidates is transmitted within the initial SIP INVITE. Namely, the initial SIP INVITE message of the emergency call arrives at the ESRP 6 that adds the list of help candidates, a PIDF document, to the message and forwards the message to the PSAP 8. The details of the SIP INVITE message are as follows.

```
INVITE urn:service:sos SIP/2.0
...
Call-Info: <urn:nena:uid:callid:bcf149461:esbc2.net>;purpose=NENA-CallId;repid="25.25.111.10:50128"
Call-Info: <urn:nena:uid:incidentid:bcf14945940391746261:esbc2.net>;
purpose=NENA-IncidentId
Geolocation: <cid:3104566996@28.28.11110>,
<cid:candidates@28.28.111.10>
Geolocation-Routing: no
...
Content-Type: multipart/mixed;boundary=unique-boundary-1
--unique-boundary-1
Content-Type: application/sdp
...
--unique-boundary-1
Content-Type: application/pidf+xml
Content-Id: <cid:3104566996@28.28.111.10>
<?xml version="1.0" encoding="UTF-8"?>
<presence xmlns="urn:ietf:params:xml:ns:pidf"
 xmlns:gp="urn:ietf:params:xml:ns:pidf:geopriv10"
 xmlns:gbp="urn:ietf:params:xml:ns:pidf:geopriv10:basicPolicy"
 xmlns:ca="urn:ietf:params:xml:ns:pidf:geopriv10:civicAddr"
 entity="sip:3104566996@28.28.111.10">
    <tuple id="SCS2-28.28.120.11:5060">
        <status>
            <gp:geopriv>
                <gp:location-info>
                <gp:usage-rules>
                <gp:method>
        </status>
        <timestamp>2020-05-18T12:42:26+00:00</timestamp>
    </tuple>
</presence>
```

```
--unique-boundary-1
Content-Type: application/pidf+xml
Content-Id: <cid:candidates@28.28.111.10>
<?xml version="1.0"encoding="UTF-8"?>
<presence xmlns="urn:ietf:params:xml:ns:pidf"
 xmlns:gp="urn:ietf:params:xml:ns:pidfgeopriv10"
 xmlns:gbp="urn:ietf:params:xml:ns:pidf:geopriv10:basicPolicy"
 xmlns: ca="urn: ietf: params:xml:ns:pidf:geopriv10:civicAddr"
 entity="sip:3104566996@28.28.111.10">
     <tuple id="candidate 01">
        <status>
            <gp:geopriv>
            <gp:location-info>
            <gp:usage-rules>
            <gp:method>
        </status>
     </tuple>
...
   <tuple id="candidate n">
        <status>
            <gp:geopriv>
            <gp:location-info>
            <gp:usage-rules>
            <gp:method>
        </status>
     </tuple>
</presence>
--unique-boundary-1--
```

Figure 9:
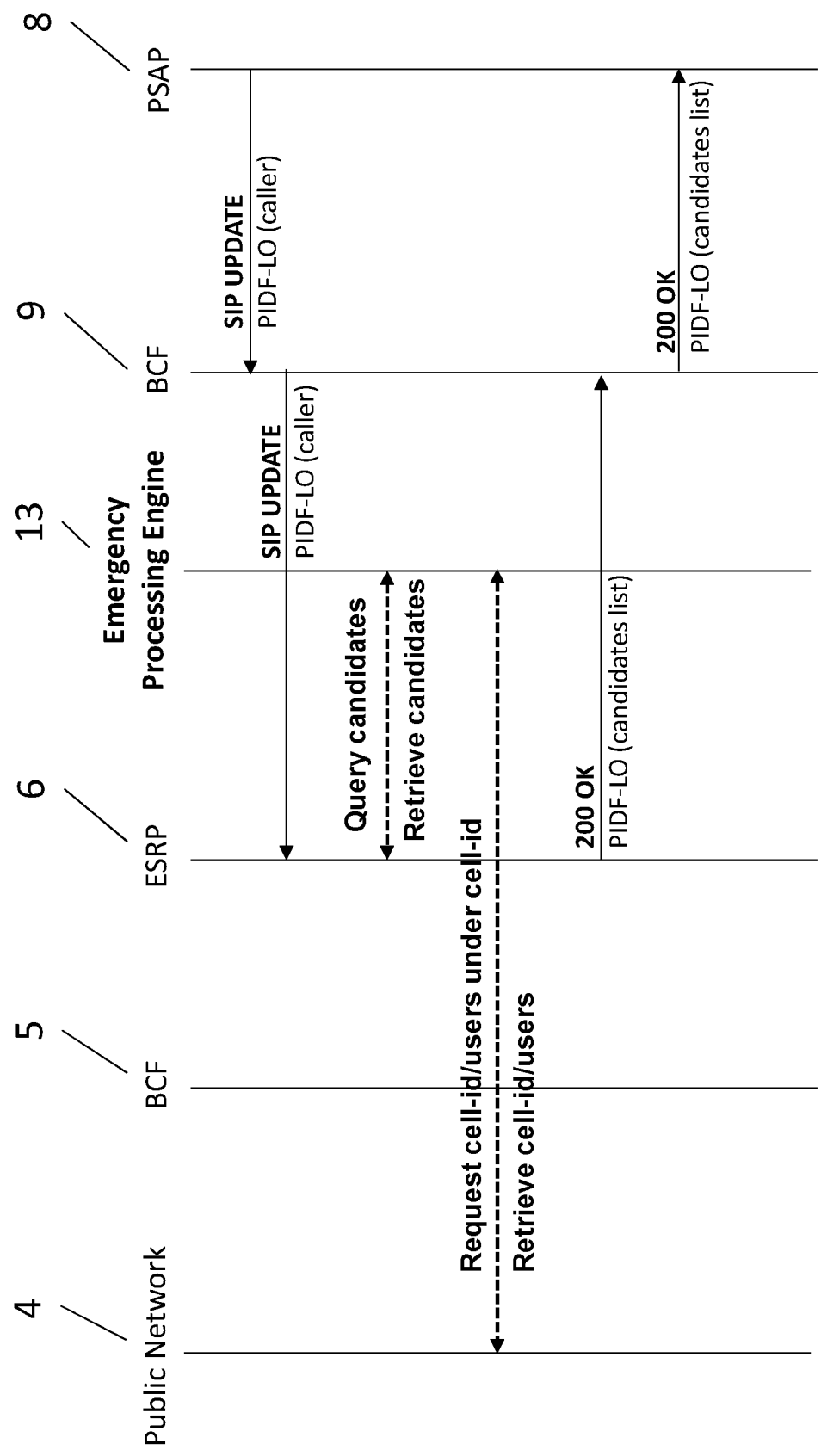
FIG. 9 illustrates the SIP message flow for delivery of a list of candidates triggered by the call taker according to an embodiment of the invention.

FIG. 9 illustrates the SIP message flow for delivery of a list of candidates triggered by the call taker according to an embodiment of the invention. A SIP UPDATE is sent from PSAP 8 to the ESINET 2 requesting a new list of help candidates 15 or a refresh for the original list. This message is sent inside the same dialog belonging to the established emergency call. The candidate list is sent from the ESINET 2 to the PSAP 8 in the 200 OK response. The details of the SIP UPDATE message are as follows. The SIP UPDATE, INFO or other message used to request the list of candidates must contain basic information for the emergency processing engine 13 so as to execute the process of obtaining the help candidate's list, namely, the incident ID: The corresponding ID for the current emergency call, and the current location information of the emergency caller.

Then, the 200OK response will contain the PIDF-LO with the help candidates for the PSAP services side, as illustrated below.

```
UPDATE <R-URI>
...
Call-Info: <urn:nena:uid:callid:bcf149461:esbc2.net>;purpose=NENA-
CallId;repid="25.25.111.10:50128"
Call-Info: <urn:nena:uid:incidentid:bcf14945940391746261:esbc2.net>;
purpose=NENA-IncidentId
Geolocation: <cid:3104566996@28.28.111.10>
Geolocation-Routing: no
...
Content-Type: multipart/mixed;boundary=unique-boundary-1
--unique-boundary-1
Content-Type: application/pidf+xml
Content-Id: <cid:3104566996@28.28.111.10>
<?xml version="1.0"encoding="UTF-8"?>
<presence xmlns="urn:ietf:params:xmlns:pidf"
 xmlns:gp="urn:ietfparams:xmlns:pidfgeopriv10"
 xmlns:gbp="urn:ietf:params:xml:ns:pidf:geopriv10:basicPolicy"
 xmlns: ca="urn:ietf: params:xml:ns:pidf:geopriv10:civicAddr"
 entity="sip:3104566996@28.28.111.10">
     <tuple id="SCS2-28.28.120.11:5060">
        <status>
            <gp:geopriv>
            <gp:location-info>
            <gp:usage-rules>
            <gp:method>
        </status>
        <timestamp>2020-05-18T12:42:26+00:00</timestamp>
     </tuple>
</presence>
--unique-boundary-1--
SIP/2.0 200 OK
...
Call-Info: <urn:nena:uid:callid:bcf149461:esbc2.net>;purpose=NENA-
CallId;repid="25.25.111.10:50128"
Call-Info: <urn:nena:uid:incidentid:bcf14945940391746261:esbc2.net>;
purpose=NENA-IncidentId
Geolocation: <cid:candidates@28.28.111.10>
Geolocation-Routing: no
...
Content-Type: multipart/mixed;boundary=unique-boundary-1
--unique-boundary-1
Content-Type: application/pidf+xml
Content-Id: <cid:candidates@28.28.111.10>
<?xml version="1.0"encoding="UTF-8"?>
<presence xmlns="urn:ietf:params:xml:ns:pidf"
 xmlns:gp="urn:ietf:params:xml:ns:pidf:geopriv10"
 xmlns:gbp="urn:ietf:params:xml:ns:pidf:geopriv10:basicPolicy"
 xmlns:ca="urn:ietf: params:xml:ns:pidf:geopriv10:civicAddr"
 entity="sip:3104566996@28.28.111.10">
     <tuple id="candidate 01">
        <status>
            <gp:geopriv>
            <gp:location-info>
            <gp:usage-rules>
            <gp:method>
        </status>
     </tuple>
...
   <tuple id="candidate n">
        <status>
            <gp:geopriv>
            <gp:location-info>
            <gp:usage-rules>
            <gp:method>
        </status>
     </tuple>
</presence>
--unique-boundary-1--
```

In the above described embodiments, SIP as a native offer-answer protocol expanding the usual call and transfer capabilities is used advantageously so as to interact and retrieve the area location of the emergency caller, to recruit possible help candidates in the same area of the emergency caller, and to sort and select one candidate adding him to an emergency call bridge. Thereby, fast and effectively help to the first response services may be provided, until the official help services like police and medics will be arriving at the location of the caller. As it is embedded into the core of the NG emergency system, the answer capability will act directly with the emergency caller that is using this system without external interferences and delays on the integration of other location services running only on the PSAP back-end.

It should be appreciated that different embodiments of the method, system, a PSAP, ESRP, and an apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A computer-implemented method of processing an emergency call in an emergency communication network comprising:
   receiving, at an Emergency Service Routing Proxy (ESRP), an emergency call from a first mobile communication device, the emergency call being received via a Session Initiation Protocol (SIP) INVITE message;
   obtaining location information of a location of the first mobile communication device;
   determining a Public Safety Answering Point (PSAP) that is in a vicinity of the location of the first mobile communication device, wherein the vicinity of the first mobile communication device is classified as being a communication device in a same cell-ID (CID) as the first mobile communication device
   forwarding the emergency call to the PSAP for being handled by a call taker at the PSAP,
   requesting, by the ESRP, location information of all mobile communication devices that are in the vicinity of the first mobile communication device,
   upon receipt of the location information, creating a list of all mobile communication devices that are in the vicinity of the first mobile communication device,
   transmitting the list to the PSAP to be displayed at a display device of a call taker at the PSAP handling the emergency call.

2. The method of claim 1, comprising:
   selecting, from the list, a mobile communication device that is closest to the first mobile communication device.

3. The method of claim 2, comprising:
   establishing a conference bridge between the first mobile communication device of the emergency caller and the call taker at the PSAP and adding the mobile communication device selected from the list to the conference bridge.

4. The method of claim 3, comprising:
   adding a first response attendant to the conference bridge.

5. The method of claim 2, comprising:
   sending a request for assistance in the reported emergency incidence to the mobile communication device selected from the list.

6. The method of claim 2, comprising:
   requesting a cell-ID (CID) of the first mobile communication device for identifying each base transceiver station (BTS) or sector of a BTS within a location area code (LAC).

7. The method of claim 2, comprising:
   displaying a map on which the emergency incident location and co-located mobile communication devices are displayed.

8. The method of claim 7, wherein the map also comprises indications of emergency facilities in the vicinity of the emergency incident location.

9. The method of claim 1, wherein the location information either is provided by value or by reference.

10. The method of claim 1, comprising: continuously updating the list to account for communication devices in the same CID as the first communication device.

11. The method of claim 10, comprising:
    refreshing a map on which the emergency incident location and the mobile communication devices that are in the vicinity of the first mobile communication device included in the list are displayed based on the updated location information of the communication devices located in the vicinity of the first communication device.

12. A computer-implemented method of processing an emergency call in an emergency communication network comprising:
    receiving, at an Emergency Service Routing Proxy (ESRP), an emergency call from a first mobile communication device, the emergency call being received via a Session Initiation Protocol (SIP) INVITE message;
    obtaining location information of a location of the first mobile communication device;
    determining a Public Safety Answering Point (PSAP) that is in a vicinity of the location of the first mobile communication device,
    forwarding the emergency call to the PSAP for being handled by a call taker at the PSAP,
    requesting, by the ESRP, location information of all mobile communication devices that are in the vicinity of the first mobile communication device,
    upon receipt of the location information, creating a list of all mobile communication devices that are in the vicinity of the first mobile communication device,
    transmitting the list to the PSAP to be displayed at a display device of a call taker at the PSAP handling the emergency call;
    requesting a cell-ID (CID) of the first mobile communication device for identifying each base transceiver station (BTS) or sector of a BTS within a location area code (LAC); and
    requesting the ANI of all mobile communication devices in the CID of the first mobile communication device.

13. The method of claim 12, comprising:
    requesting, with the ANI of the mobile communication devices in the CID of the first mobile communication device, the Location Information Service (LIS) for their respective current location.

14. An emergency communication apparatus comprising:
    an emergency processing engine connectable to an Emergency Service Routing Proxy (ESRP) and/or a Public Safety Answering Point (PSAP), emergency processing engine configured to perform a method comprising:
    obtaining location information of a location of a first mobile communication device that made an emergency call about an emergency incident
    determining a Public Safety Answering Point (PSAP) that is in a vicinity of the location of the first mobile communication device,
    forwarding the emergency call to the PSAP for being handled by a call taker at the PSAP,
    upon receipt of location information of all mobile communication devices that are in the vicinity of the first mobile communication device, creating a list of all mobile communication devices that are in the vicinity of the first mobile communication device,
    transmitting the list to the PSAP to be displayed at a display device of a call taker at the PSAP handling the emergency call, and refreshing a map on which the emergency incident location and the mobile communication devices that are in the vicinity of the first mobile communication device included in the list are displayed based on updated location information of the communication devices located in the vicinity of the first communication device.

15. The emergency communication apparatus of claim 14 comprising the PSAP and the ESRP.

16. The emergency communication apparatus of claim 14 wherein the method also comprises displaying a map on which the emergency incident location and the mobile communication devices of the list of all mobile communication devices that are in the vicinity of the first mobile communication device are displayed.

17. The emergency communication apparatus of claim 14, wherein the map also comprises indications of emergency facilities in the vicinity of the emergency incident location.

18. The emergency communication apparatus of claim 17, wherein the method also comprises requesting a cell-ID (CID) of the first mobile communication device for identifying each base transceiver station (BTS) or sector of a BTS within a location area code (LAC).

\* \* \* \* \*